UNITED STATES PATENT OFFICE.

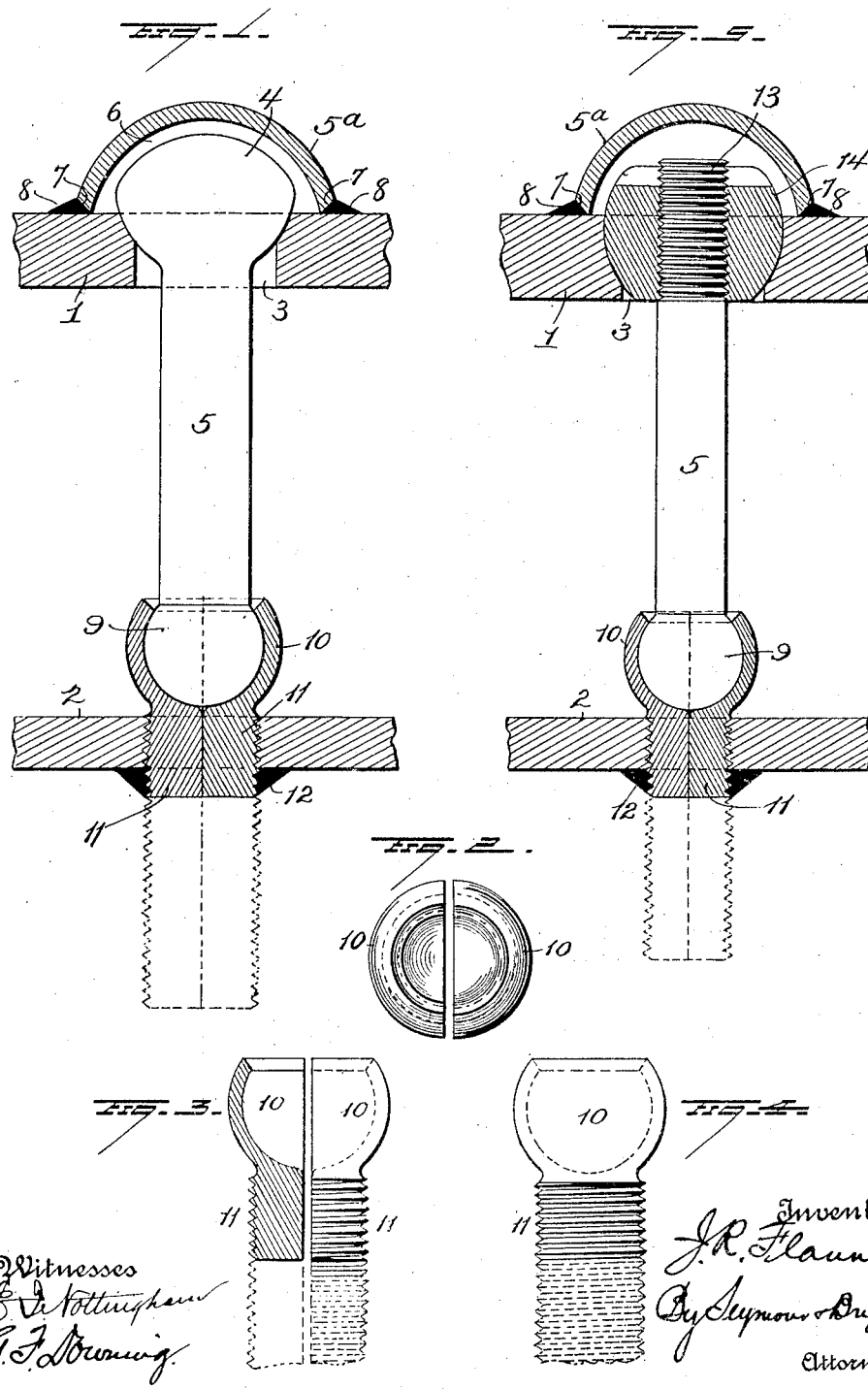

JOHN ROGERS FLANNERY, OF PITTSBURGH, PENNSYLVANIA, ASSIGNOR TO FLANNERY BOLT COMPANY, OF PITTSBURGH, PENNSYLVANIA.

STAYBOLT STRUCTURE FOR STEAM-BOILERS.

1,359,587.

Specification of Letters Patent. Patented Nov. 23, 1920.

Application filed April 17, 1919. Serial No. 290,708.

*To all whom it may concern:*

Be it known that I, JOHN ROGERS FLANNERY, a citizen of the United States, and a resident of Pittsburgh, in the county of Allegheny and State of Pennsylvania, have invented certain new and useful Improvements in Staybolt Structures for Steam-Boilers; and I do hereby declare the following to be a full, clear, and exact description of the invention, such as will enable others skilled in the art to which it appertains to make and use the same.

This invention relates to improvements in staybolt structures for boilers,—one object of the invention being to provide simple means whereby both ends of a double headed staybolt shall be employed to connect the outer and inner boiler sheets and movably connected with both, and so that the bolt heads and their bearings will be so protected as to obviate leakage.

With this and other objects in view, the invention consists in certain novel features of construction and combinations of parts as hereinafter set forth and pointed out in the claims.

In the accompanying drawings; Figure 1 is a sectional view showing an embodiment of my invention; Figs. 2, 3 and 4 are detail views, and Fig. 5 is a view showing a modification.

1 represents the outer sheet and 2 the inner sheet of a boiler. The outer boiler sheet is provided with openings such as illustrated at 3 and a portion of each of said openings is enlarged and made with a curved wall to form a bearing for the head 4 which is made integral with the outer end of the body portion 5 of a staybolt. A cap or closure 5ª is disposed over the head 4 of the staybolt so as to cover the same, said cap having such internal dimensions as to provide a clearance space 6. The cap 5ª may be made concavo-convex in form and its edge portion may be beveled as at 7 and engage the outer face of the outer boiler sheet around the bolt head and its bearing in the boiler sheet. Between the beveled edge of the cap and the outer boiler sheet, a welding alloy is accumulated or built up by a suitable electric or other welding method, as indicated at 8, and thus the cap is securely welded to the outer face of the outer boiler sheet.

The staybolt is provided also at its inner end with a head 9 and this head (which is preferably smaller than the head at the outer end of the bolt) is made spherical in form. The spherical head or ball 9 at the inner end of the bolt is movably mounted in the partly spherical socket of a thimble 10 having a threaded shank 11 passing through a threaded opening in the inner boiler sheet. Thus it will be seen that the inner end of the staybolt has a universal or ball-and-socket connection with the inner boiler sheet, and when said thimble shall have been placed in position, it will be welded to the inner face of the inner boiler sheet with the use of a welding alloy which is welded by electric or other welding method to the threaded shank and the inner boiler sheet as indicated at 12.

The thimble with its shank is made in a plurality of parts, two parts being indicated in Figs. 1, 2 and 5 and the shank portion is made of sufficient length to compensate for varying distances apart of the sheets forming the water leg of the boiler.

In assembling the thimble on the inner headed end of the staybolt, the members of the thimble are placed on the head or ball 9 and the abutting edges of said members may be welded together. The shank portion of the thimble will then be threaded and after the staybolt and thimble shall have been placed in position in the boiler sheets, a surplus portion of the threaded shank will be cut off, leaving only a short portion projecting inwardly beyond the inner boiler sheet, and the weld 12 will be built up around this projecting portion of the shank.

Instead of forming the outer head 4 of the staybolt integral with the body of the bolt, the latter may be threaded, as at 13, and a partly spherical head 14, made in the form of a sleeve, screwed on said outer end portion of the body of the bolt, as shown in Fig. 5.

Other changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with outer and inner boiler sheets of a staybolt having a head at each end, the outer sheet carrying a bearing for the outer head of the bolt, a thimble comprising a plurality of parts welded together and forming a socket to receive the head at the inner end of the bolt and a threaded shank to pass through the inner boiler sheet, and a weld surrounding the shank portion of the thimble and welding the same to the inner boiler sheet.

2. The combination with an outer boiler sheet provided with a bearing for the head of a bolt, and an inner boiler sheet having an opening, of a bolt having heads integral with its respective ends, the outer head mounted in the bearing on the outer boiler sheet, a thimble comprising a plurality of united parts having a shank passing through the inner boiler sheet and welded to the latter, said thimble having a socket portion receiving the head at the inner end of the staybolt.

3. The combination with outer and inner boiler sheets, of a staybolt having a head at each end, one of said boiler sheets provided with a bearing for the head at one end of the staybolt, a thimble comprising a plurality of parts coöperating to form a socket for the head at the other end of the staybolt, said thimble being secured to the other boiler sheet.

4. The combination with inner and outer boiler sheets, of a staybolt having a head at each end, one of said boiler sheets provided with a bearing for the head at one end of said staybolt, and a thimble comprising a plurality of parts forming a socket to receive the head at the other end of the staybolt and a shank secured to the other boiler sheet.

In testimony whereof, I have signed this specification in the presence of two subscribing witnesses.

JOHN ROGERS FLANNERY.

Witnesses:
ETHAN I. DODDS,
JAS. R. HORAN.